Aug. 19, 1958   R. S. KOFFORD   2,848,013
POULTRY WATERING CUP
Filed June 10, 1957

INVENTOR.
REED S. KOFFORD
BY Robert C. Comstock
ATTORNEY

United States Patent Office 2,848,013
Patented Aug. 19, 1958

2,848,013

POULTRY WATERING CUP

Reed S. Kofford, Van Nuys, Calif.

Application June 10, 1957, Serial No. 664,827

2 Claims. (Cl. 137—408)

This invention relates to a self-filling poultry watering cup, in which the water in the cup is balanced against a counterweight so that a water supply valve is opened as the cup becomes partially empty and closed when the cup is filled to the desired level.

The present application is a continuation-in-part and improvement upon the subject matter of my previous Patent No. 2,796,077, issued June 18, 1957.

It is an object of this as well as my previous invention to provide such a cup which possesses advantages over those now in use, one advantage in particular being avoiding clogging of the water supply to the cup. Since the amount of water held in the cup is small, the water inlet is likewise small in diameter. In the past, such inlets have customarily been formed of metal, which becomes corroded or to which mineral or other deposits adhere over a period of time. Since the inlet is small in size, it does not take a large amount of deposits or other interference to cause serious clogging which partially or entirely blocks the water flow to the cup. In previous construction, it has also been difficult or impossible to gain access to the water inlet in order to clean it and return it to its original size and condition.

It is an object of my invention to overcome these difficulties by providing a water inlet which is formed entirely of plastic material such as nylon. The water inlet will thus not corrode and mineral deposits will not readily adhere to it, so that the water inlet will remain clean and clear for a far greater length of time than with previous devices.

It is a further object of my invention to provide a cup of the class described having a water holding portion which is capable of being moved without disassembly of any parts in order to permit the insertion of a cleaning implement into and through the water inlet, and to permit cleaning of the cup assembly. While this was also a feature of the construction shown in my previous application, it was found that the construction there provided had one disadvantage in use. Because the water holding portion was freely pivotable, the poultry would often peck at the rim of the cup and cause it to pivot, spilling water into the cage. This resulted in undesirable accumulations of water within the cage, causing unsanitary conditions and imperiling the health of the poultry.

It is accordingly an object of the present invention to provide a poultry watering cup which retains all of the advantages present in the prior construction while at the same time overcoming the above described fault. The present invention accordingly contemplates a construction in which the water holding portion of the cup can not be pivoted to any substantial degree by poultry pecking at the rim or contacting the cup. At the same time, the water holding portion is pivotable at the discretion of the poultryman for the purpose of permitting access to the water inlet or other portions of the cup. This is achieved by providing stop means between the pivoting and non-pivoting portions of the cup, such stop means being selectively engageable by the poultryman.

It is a further object of my invention to provide such a device in which the water holding portion of the cup is formed of a single piece of molded plastic such as nylon. The material used is preferably somewhat resilient, so that breakage is substantially impossible. The resistance of the plastic material to deterioration and to the adherence of foreign material is equally advantageous in the case of the water holding portion as in the water inlet.

Another object of my invention is to provide a water inlet element which also acts as a fulcrum for the pivotal mounting of the water holding portion and counterweight.

It is a further object of my invention to provide an improved and simplified means of effecting such pivotal mounting comprising an easily insertable and removable pin clip. A portion of the same pin clip is also adapted to selectively engage a stop member on the water holding portion of the cup in order to prevent undesirable spilling of the water by the poultry.

My invention also comprises such other objects, advantages and capabilities as will later more fully appear and which are inherently possessed by my invention.

While I have shown in the accompanying drawings a preferred embodiment of my invention, it should be understood that the same is susceptible of modification and change without departing from the spirit of my invention.

Referring to the drawings.

Figure 1:
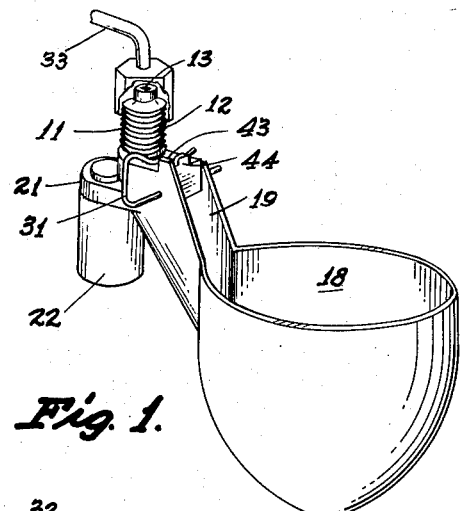
Fig. 1 is a perspective view of my poultry watering cup, with the water holding portion locked in its normal position.
Figure 2:
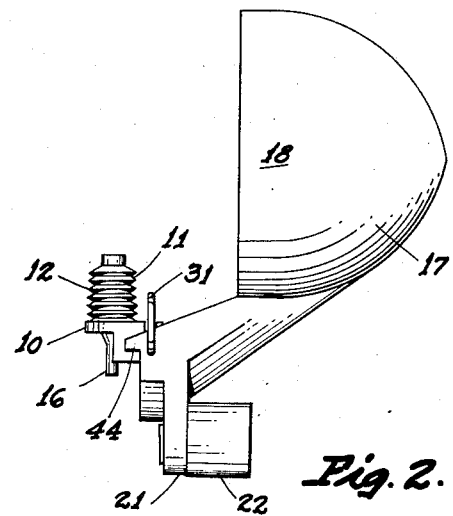
Fig. 2 is a side elevational view of my cup, with the water holding portion released and pivoted upwardly for cleaning purposes.
Figure 5:
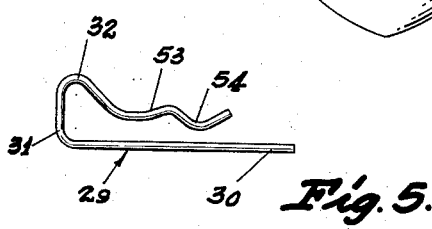
Fig. 5 is a side elevational view of the pivot pin.
Figure 3:
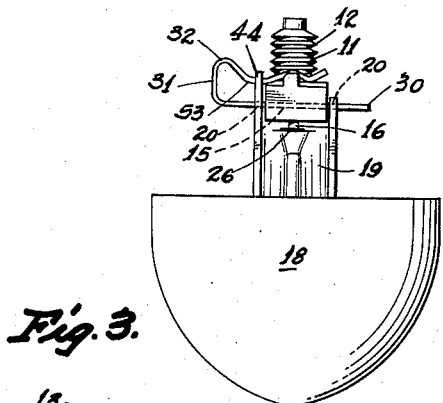
Fig. 3 is a front elevational view of my cup, with the water holding portion locked in normal position.
Figure 4:
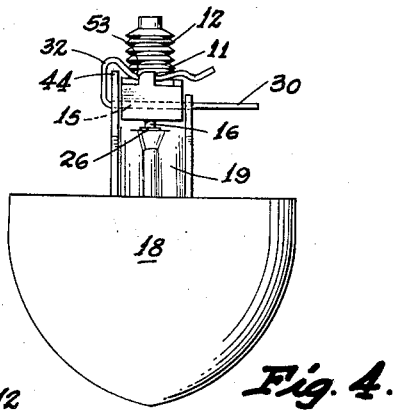
Fig. 4 is a similar view, with the pivot pin moved so that the water holding portion is released.
Figures 6, 7:
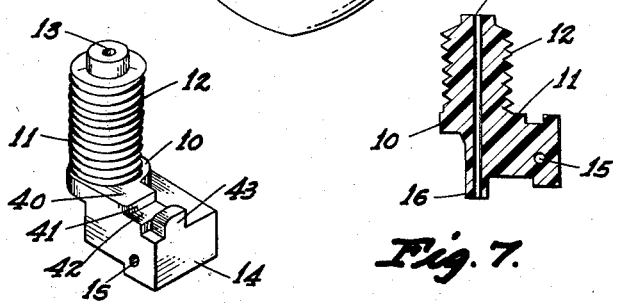
Fig. 6 is a perspective view of the connector.
Fig. 7 is a sectional view of the same.

A preferred embodiment which has been selected to illustrate my invention comprises a water inlet member 10, which preferably comprises a single piece of suitable molded plastic, such as nylon. Water inlet member 10 includes a connector 11, which is cylindrical in contour and which is provided with external screw threading 12. A narrow water flow tube 13 extends through the longitudinal axis of connector 11.

A pivot flange 14 is formed integrally with connector 11 and extends outwardly substantially at a right angle with respect thereto. A pivot opening 15 extends through pivot flange 14 adjacent the end thereof, transversely to water flow tube 13.

The upper surface of the pivot flange 14 is provided with a raised portion 40 which extends outwardly from the connector 11, dropping downwardly at a right angle to provide a vertical shoulder 41, a flat track 42 and an upwardly directed boss 43 on the opposite side of the track 42. The boss 43 is only about half as wide as the remainder of the raised portion 40 and has both of its surfaces adjacent to the track 42 somewhat rounded off.

The bottom of connector 11 is provided with a funnel shaped spout 16, which is formed integrally with water inlet 10 and through which water flow tube 13 extends. The bottom of spout 16 is circular in contour.

A cup member 17 is likewise preferably formed of a single piece of suitable molded plastic material, such as nylon. The cup member 17 includes a hollow water holding portion 18 having an open top from which the poultry can drink. The walls of water holding portion 18 are preferably sufficiently thin so as to be somewhat flexible. This permits a considerable amount of abuse of this portion of my device without danger of breakage.

Extending upwardly from water holding portion 18 at an angle with respect thereto is a channel 19, which is formed as an integral part of cup member 17. Channel 19 is U-shaped in cross-section, having an open top with oppositely disposed side walls joined by a rounded bottom portion. A pair of aligned pivot openings 20 extend transversely through the side wall of channel 19 adjacent the top thereof. A stop member 44 is formed integrally with one side of the side wall of channel 19 and extends upwardly therefrom.

Extending outwardly from the top of channel 19 in a direction parallel but opposite to water holding portion 18 is a counter-weight portion 21. Counter-weight portion 21 is preferably formed integrally with cup member 17 and has straight sides and a rounded end. A counter-weight 22, which is preferably formed of lead, is secured to the counter-weight portion 21.

Mounted adjacent the upper end of channel 19 is a resilient valve seat 26 which is disposed directly beneath the bottom of the spout 16.

A pivot pin 29 which is preferably formed of somewhat resilient wire is used to pivotally attach the two component parts of my cup to each other. The pivot pin 29 has a straight bottom leg 30 which serves as a pivot. A vertical leg 31 extends upwardly from one end of the bottom leg 30. The vertical leg 31 connects to a first horizontal leg 32 which extends a short distance substantially parallel to the bottom leg 30 and then curves downwardly to a longer second horizontal leg 53, which in turn curves into a dog leg 54 at the end of the upper portion of the pin 29.

In assembling my device, the bottom leg 30 of the pivot pin 29 is passed through the openings 20 in channel 19 and the pivot opening 15 in the pivot flange 14. The upper portion of the pivot pin 29 passes over the raised portion 40 on the upper surface of the pivot flange 14, sliding along the track 42 between the shoulder 41 and boss 43. During such movement, the downwardly directed portion of the dog leg 54 is moved upwardly, causing the upper portion of the pivot pin 29 to be flexed upwardly away from the bottom leg 30. Movement of the pivot pin 29 is continued until a stable position is achieved in which the downwardly directed portion of the dog leg 54 is disposed beyond the raised portion 40 and the end of the second horizontal leg 53 is in contact with the track 42.

In use, the connector 11 is screw threadedly attached to a suitable water pipe 33. When the water is turned on, it flows downwardly through water flow tube 13 and out of the bottom of spout 16. From spout 16 it flows downwardly along channel 19 into water holding portion 18. As the water holding portion 18 becomes full of water, its weight increases. This results in downward movement of the water holding portion 18, since it is disposed on the opposite side of pivot pin 29 from the counterweight 22. The pivot pin 29 and pivot flange 14 act as a fulcrum, with the weight of the water in water holding portion 18 being balanced against the counter-weight 22.

As water holding portion 18 fills, it moves toward a more horizontal position, finally reaching a position where the bottom of the spout 16 is brought into contact with the top of valve seat 26, which acts to seal off the bottom of water flow tube 13 to prevent further water from flowing into channel 19 or water holding portion 18. This seal is maintained until sufficient water is removed from water holding portion 18 so that the counter-weight 22 lowers its end to separate the bottom of spout 16 from valve seat 26 and permit further water flow. In actual practice, a delicate balance is maintained so that substantially the same amount of water is present in water holding portion 18 at all times.

It will be noted that while the pivot pin 29 is in the position described, the water holding portion 18 is capable of only limited pivotal movement with respect to the connector 11. Such limited pivotal movement is sufficient to permit the flow of water described. Further pivotal movement of the water holding portion is prevented by the engagement of the upwardly directed stop member 44 with the second horizontal leg 53 of the pivot pin 29. In the position described, the pivot pin 29 is spaced only a short distance from the stop member 44, permitting slight pivotal movement and preventing extensive pivotal movement of the water holding portion 18.

If the poultryman desires to clean the water flow tube 13 or replace the valve seat 26 or clean the cup member 17 or perform any other cleaning or replacement operation on the cup, he need only exert finger pressure on the vertical leg 31 of the pivot pin 29. This causes the second horizontal leg 53 to slide further along the track 42 until its opposite end is disposed adjacent the boss 43 and the vertical leg 31 is disposed directly beside the stop member 44.

Since the stop member 44 is shorter than the vertical leg 31, it passes freely through the opening defined by the vertical leg 31 and first horizontal leg 32, permitting free pivotal movement of the water holding portion 18 from its normal position transverse to the connector 11 to a position parallel to the connector 11. Such position permits the insertion of a cleaning wire through the water flow tube 13 and also permits replacement of the valve seat 26, as well as cleaning of various portions of the cup.

When the cleaning and maintenance operations have been completed the poultryman slides the pivot pin 29 back to the position first described and the water holding portion 18 is again locked against free pivotal movement. If poultry should peck at the rim of the cup or bump into the cup, it can not move a sufficient distance to spill the water held in the water holding portion 18.

I claim:

1. In a pivotally mounted poultry watering device which includes a water inlet member and a cup member, a pivot pin having a bottom leg slidably extending through said water inlet member and said cup member to provide a pivotal connection between said members, said water inlet member having a track extending thereacross transversely with respect to said cup member, said pivot pin having an upper leg mounted for sliding movement within said track transversely with respect to said cup member, the bottom leg of said pivot pin being substantially longer than the transverse length of said water inlet member and cup member at their point of pivotal connection to permit transverse movement of said pivot pin without affecting the pivotal connection between said members, said cup member having an upwardly directed stop member disposed adjacent to said track and extending upwardly above said track, said pivot pin having an upwardly directed portion extending upwardly above said upper leg and above said stop member, said upwardly directed portion having an open area therebeneath, said pivot pin being slidably movable transversely with respect to said cup member between two positions, in one of which a portion of said upper leg is disposed adjacent said stop member to engage said stop member and limit the pivotal movement of said cup member, and in the other of which the upwardly directed portion of said pivot pin is disposed adjacent said stop member to permit extended pivotal movement of said cup member, with said stop member pasing through the open area beneath the upwardly directed portion of said pivot pin.

2. The structure described in claim 1, in which said bottom leg, upper leg and upwardly directed portion all comprise integral parts of a single elongated pin, with said upwardly directed portion joining said bottom and upper legs at one end thereof, said upwardly directed portion providing resilient means for holding said upper leg within said track.

References Cited in the file of this patent

UNITED STATES PATENTS

| | | |
|---|---|---|
| 2,616,444 | Norland | Feb. 23, 1950 |
| 2,714,391 | Goff | Aug. 2, 1955 |
| 2,796,077 | Kofford | June 18, 1957 |